United States Patent
Hussey et al.

(10) Patent No.: US 7,268,924 B2
(45) Date of Patent: Sep. 11, 2007

(54) OPTICAL READER HAVING REDUCED PARAMETER DETERMINATION DELAY

(75) Inventors: Robert M. Hussey, Camillus, NY (US); Robert Gardiner, Fayetteville, NY (US); Matthew Pankow, Camillus, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 523 days.

(21) Appl. No.: 09/766,922

(22) Filed: Jan. 22, 2001

(65) Prior Publication Data

US 2002/0125317 A1 Sep. 12, 2002

(51) Int. Cl.
*H04N 1/04* (2006.01)

(52) U.S. Cl. ................ 358/484; 358/509; 358/516; 358/520; 358/446; 358/475

(58) Field of Classification Search ............ 358/505, 358/509, 513, 516, 518, 520, 530, 446, 475, 358/480, 482, 484, 1.17; 348/22, 97, 294, 348/300
See application file for complete search history.

(56) References Cited

U.S. PATENT DOCUMENTS

| | | |
|---|---|---|
| 3,582,884 A | 6/1971 | Shepard |
| 3,663,762 A | 5/1972 | Joel, Jr. |
| 3,684,868 A | 8/1972 | Christie et al. |
| 3,723,970 A | 3/1973 | Stoller |
| 3,906,166 A | 9/1975 | Cooper et al. |
| 4,004,237 A | 1/1977 | Kratzer |
| 4,041,391 A | 8/1977 | Deerkoski |

(Continued)

FOREIGN PATENT DOCUMENTS

| | | |
|---|---|---|
| EP | 0 364 676 A2 | 4/1990 |
| EP | 0 449 634 A2 | 10/1991 |
| EP | 0 653 720 A2 | 5/1995 |
| EP | 0 722 148 A2 | 7/1996 |
| EP | 0 690 403 A2 | 1/1998 |

(Continued)

OTHER PUBLICATIONS

U.S. Appl. No. 10/651,298, filed Aug. 28, 2003, Barber et al.
Jakl, Edward A., "Why CMOS Image Sensors are Poised to Surpass CCDs," International IC '99, Conference Proceedings, pp. 64–71.

(Continued)

*Primary Examiner*—Jerome Grant, II
(74) *Attorney, Agent, or Firm*—Marjama & Bilinski LLP (57) ABSTRACT

In the present invention, an optical reader image sensor is adapted to clock out image data from an image sensor according to "low resolution" mode of operation in order to reduce a parameter determination delay of the reader. In a low resolution mode, some pixels of the readers image sensor array are clock out at normal clock out speed sufficient to develop electrical signals accurately reflecting the intensity of light at the respective pixel positions, while other pixels of the array are either not clocked out or are clocked out at a higher clock out rate which may be insufficient to allow development of electrical signals that accurately represent light incident on the image sensor's sensor array but which nevertheless, results in a reduction of the overall frame clock out rate of the frame of image data. An optical reader according to the invention operates in a low resolution frame clock out mode to capture a low resolution parameter determining frame of image data at high speed, reads pixel data from the parameter determination frame to determine an operation parameter based on actual illumination conditions, then utilizes the operation parameter in operating an optical reader.

147 Claims, 5 Drawing Sheets

U.S. PATENT DOCUMENTS

| | | |
|---|---|---|
| 4,097,847 A | 6/1978 | Forsen et al. |
| 4,114,155 A | 9/1978 | Raab |
| 4,164,628 A | 8/1979 | Ward et al. |
| 4,210,802 A | 7/1980 | Sakai |
| 4,291,410 A | 9/1981 | Caples et al. |
| 4,315,245 A | 2/1982 | Nakahara et al. |
| 4,435,822 A | 3/1984 | Spencer et al. |
| 4,445,118 A | 4/1984 | Taylor et al. |
| 4,488,678 A | 12/1984 | Hara et al. |
| 4,488,679 A | 12/1984 | Bockholt et al. |
| 4,500,776 A | 2/1985 | Laser |
| 4,538,060 A | 8/1985 | Sakai et al. |
| 4,542,528 A | 9/1985 | Sanner et al. |
| 4,561,089 A | 12/1985 | Rouse et al. |
| 4,610,359 A | 9/1986 | Muller |
| 4,628,532 A | 12/1986 | Stone et al. |
| 4,636,624 A | 1/1987 | Ishida et al. |
| 4,639,932 A | 1/1987 | Schiff |
| 4,644,523 A | 2/1987 | Horwitz |
| 4,646,353 A | 2/1987 | Tenge et al. |
| 4,653,076 A | 3/1987 | Jerrim et al. |
| 4,686,363 A | 8/1987 | Schoon |
| 4,690,530 A | 9/1987 | Fujino et al. |
| 4,710,817 A | 12/1987 | Ando |
| 4,757,057 A | 7/1988 | Fussi et al. |
| 4,785,463 A | 11/1988 | Janc et al. |
| 4,791,446 A | 12/1988 | Ishida et al. |
| 4,794,239 A | 12/1988 | Allais |
| 4,807,256 A | 2/1989 | Holmes et al. |
| 4,818,856 A | 4/1989 | Matsushima et al. |
| 4,841,544 A | 6/1989 | Nuytkens |
| 4,877,949 A | 10/1989 | Danielson et al. |
| 4,901,073 A | 2/1990 | Kibrick |
| 4,908,500 A | 3/1990 | Baumberger |
| 4,933,538 A | 6/1990 | Heiman et al. |
| 4,942,474 A | 7/1990 | Akimoto et al. |
| 5,019,699 A | 5/1991 | Koenck |
| 5,113,445 A | 5/1992 | Wang |
| 5,138,140 A | 8/1992 | Siemiatkowski et al. |
| 5,153,421 A | 10/1992 | Tandon et al. |
| 5,212,777 A | 5/1993 | Gove et al. |
| 5,229,591 A | 7/1993 | Heiman et al. |
| 5,235,167 A | 8/1993 | Dvorkis et al. |
| 5,245,695 A | 9/1993 | Basehore |
| 5,250,791 A | 10/1993 | Heiman et al. |
| 5,262,871 A | 11/1993 | Wilder et al. |
| 5,286,960 A | 2/1994 | Longacre, Jr. et al. |
| 5,294,783 A | 3/1994 | Hammond, Jr. et al. |
| 5,304,787 A | 4/1994 | Wang |
| 5,311,001 A | 5/1994 | Joseph et al. |
| 5,319,185 A | 6/1994 | Obata |
| 5,331,176 A | 7/1994 | Sant' Anselmo et al. |
| 5,343,028 A | 8/1994 | Figarella et al. |
| 5,345,266 A | 9/1994 | Denyer |
| 5,354,977 A | 10/1994 | Roustaei |
| 5,378,883 A | 1/1995 | Batterman et al. |
| 5,392,447 A | 2/1995 | Schlack et al. |
| 5,396,053 A | 3/1995 | Swartz et al. |
| 5,396,054 A | 3/1995 | Krichever et al. |
| 5,401,949 A | 3/1995 | Ziemack et al. |
| 5,414,251 A | 5/1995 | Durbin |
| 5,420,409 A | 5/1995 | Longacre, Jr. et al. |
| 5,430,286 A | 7/1995 | Hammond, Jr. et al. |
| 5,446,271 A * | 8/1995 | Cherry et al. ............ 235/462.1 |
| 5,461,425 A | 10/1995 | Fowler et al. |
| 5,463,214 A | 10/1995 | Longacre, Jr. et al. |
| 5,471,515 A | 11/1995 | Fossum et al. |
| 5,471,592 A | 11/1995 | Gove et al. |
| 5,477,042 A | 12/1995 | Wang |
| 5,478,997 A | 12/1995 | Bridgelall et al. |
| 5,504,524 A | 4/1996 | Lu et al. |
| 5,506,880 A | 4/1996 | Scardino et al. |
| 5,512,739 A | 4/1996 | Chandler et al. |
| 5,521,366 A | 5/1996 | Wang et al. |
| 5,524,068 A | 6/1996 | Kacandes et al. |
| 5,525,788 A | 6/1996 | Bridgelall et al. |
| 5,537,431 A | 7/1996 | Chen et al. |
| 5,545,886 A | 8/1996 | Metlitsky et al. |
| 5,561,283 A | 10/1996 | Dvorkis et al. |
| 5,569,901 A | 10/1996 | Bridgelall et al. |
| 5,572,006 A | 11/1996 | Wang et al. |
| 5,585,616 A | 12/1996 | Roxby et al. |
| 5,591,956 A | 1/1997 | Longacre, Jr. et al. |
| 5,598,007 A | 1/1997 | Bunce et al. |
| 5,600,119 A | 2/1997 | Dvorkis et al. |
| 5,610,387 A | 3/1997 | Bard et al. |
| 5,619,597 A | 4/1997 | Moreton |
| 5,621,203 A | 4/1997 | Swartz et al. |
| 5,640,202 A | 6/1997 | Kondo et al. |
| 5,657,395 A | 8/1997 | Hirota |
| 5,663,549 A | 9/1997 | Katz et al. |
| 5,665,954 A | 9/1997 | Bard et al. |
| 5,665,959 A | 9/1997 | Fossum et al. |
| 5,668,803 A | 9/1997 | Tymes et al. |
| 5,672,858 A | 9/1997 | Li et al. |
| 5,692,062 A | 11/1997 | Lareau et al. |
| 5,703,349 A | 12/1997 | Meyerson et al. |
| 5,710,417 A | 1/1998 | Joseph et al. ............ 235/462 |
| 5,717,602 A | 2/1998 | Kenning |
| 5,723,823 A | 3/1998 | Bell |
| 5,723,853 A | 3/1998 | Longacre, Jr. et al. |
| 5,723,868 A | 3/1998 | Hammond, Jr. et al. |
| 5,739,518 A | 4/1998 | Wang |
| 5,756,981 A | 5/1998 | Roustaei et al. |
| 5,773,806 A | 6/1998 | Longacre, Jr. |
| 5,773,810 A | 6/1998 | Hussey et al. |
| 5,774,357 A | 6/1998 | Hoffberg et al. |
| 5,780,834 A | 7/1998 | Havens et al. |
| 5,784,102 A | 7/1998 | Hussey et al. |
| 5,811,785 A | 9/1998 | Heiman et al. |
| 5,814,803 A | 9/1998 | Olmstead et al. |
| 5,818,528 A | 10/1998 | Roth et al. |
| 5,821,523 A | 10/1998 | Bunte et al. |
| 5,825,006 A | 10/1998 | Longacre, Jr. et al. |
| 5,831,254 A | 11/1998 | Karpen et al. |
| 5,831,674 A | 11/1998 | Ju et al. |
| 5,841,121 A | 11/1998 | Koenck |
| 5,841,126 A | 11/1998 | Fossum et al. |
| 5,866,894 A | 2/1999 | Bard et al. |
| 5,875,108 A | 2/1999 | Hoffberg et al. |
| 5,877,487 A | 3/1999 | Tani et al. |
| 5,900,613 A | 5/1999 | Koziol et al. |
| 5,902,988 A | 5/1999 | Durbin |
| 5,917,171 A | 6/1999 | Sasai |
| 5,920,477 A | 7/1999 | Hoffberg et al. |
| 5,926,214 A | 7/1999 | Denyer et al. |
| 5,929,418 A | 7/1999 | Ehrhart et al. ............ 235/462 |
| 5,932,862 A | 8/1999 | Hussey et al. |
| 5,942,741 A | 8/1999 | Longacre, Jr. et al. |
| 5,949,052 A | 9/1999 | Longacre, Jr. et al. |
| 5,949,054 A | 9/1999 | Karpen et al. |
| 5,949,056 A | 9/1999 | White |
| 5,965,863 A | 10/1999 | Parker et al. |
| 5,965,883 A | 10/1999 | Parker et al. |
| 5,969,753 A | 10/1999 | Robinson |
| 5,979,768 A | 11/1999 | Koenck |
| 5,984,186 A | 11/1999 | Tafoya ............ 235/462.24 |
| 5,986,297 A | 11/1999 | Guidash et al. |
| 5,996,895 A | 12/1999 | Heiman et al. |
| 6,003,008 A | 12/1999 | Postrel et al. |
| 6,017,496 A | 1/2000 | Nova et al. |

| | | |
|---|---|---|
| 6,019,286 A | 2/2000 | Li et al. |
| 6,044,180 A | 3/2000 | Brandestini et al. |
| 6,047,085 A | 4/2000 | Sato et al. |
| 6,119,179 A | 9/2000 | Whitridge et al. |
| 6,123,264 A | 9/2000 | Li et al. |
| 6,141,046 A | 10/2000 | Roth et al. |
| 6,144,453 A | 11/2000 | Hallerman et al. |
| 6,155,488 A | 12/2000 | Olmstead et al. |
| 6,155,491 A | 12/2000 | Dueker et al. |
| 6,161,760 A | 12/2000 | Marrs et al. |
| 6,164,545 A | 12/2000 | Danielson |
| 6,170,749 B1 | 1/2001 | Goren et al. |
| 6,175,357 B1 | 1/2001 | Gordon |
| 6,176,429 B1 | 1/2001 | Reddersen et al. |
| 6,177,999 B1 | 1/2001 | Wurz et al. |
| 6,179,208 B1 | 1/2001 | Feng |
| 6,186,404 B1 | 2/2001 | Ehrhart et al. |
| 6,219,182 B1 | 4/2001 | McKinley |
| 6,229,921 B1 | 5/2001 | Wenzel et al. |
| 6,233,011 B1 | 5/2001 | Su |
| 6,240,218 B1 | 5/2001 | Michael et al. |
| 6,246,779 B1 | 6/2001 | Fukui et al. |
| 6,257,490 B1 | 7/2001 | Tafoya |
| 6,264,105 B1 | 7/2001 | Longacre, Jr. et al. |
| 6,267,501 B1 | 7/2001 | Wand et al. |
| 6,268,848 B1 | 7/2001 | Eglit |
| 6,268,883 B1 | 7/2001 | Zehnder et al. |
| 6,268,918 B1 | 7/2001 | Tanabe et al. |
| 6,276,605 B1 | 8/2001 | Olmstead et al. |
| 6,329,139 B1 | 12/2001 | Nova et al. |
| 6,330,975 B1 | 12/2001 | Bunte et al. |
| 6,347,163 B2 | 2/2002 | Roustaei |
| 6,348,773 B1 | 2/2002 | Dvorkis et al. |
| 6,360,948 B1 | 3/2002 | Yang et al. |
| 6,385,352 B1 | 5/2002 | Roustaei |
| 6,398,112 B1 | 6/2002 | Li et al. |
| 6,429,934 B1 | 8/2002 | Dunn et al. |
| 6,462,842 B1 * | 10/2002 | Hamilton ................... 358/486 |
| 6,486,911 B1 | 11/2002 | Denyer et al. |
| 6,491,223 B1 | 12/2002 | Longacre, Jr. et al. |
| 6,493,029 B1 | 12/2002 | Denyer et al. |
| 6,505,778 B1 | 1/2003 | Reddersen et al. |
| 6,512,218 B1 | 1/2003 | Canini et al. |
| 6,525,827 B2 | 2/2003 | Liu |
| 6,547,139 B1 | 4/2003 | Havens et al. |
| 6,547,142 B1 | 4/2003 | Goren et al. |
| 6,552,323 B2 | 4/2003 | Guidash et al. |
| 6,552,746 B1 | 4/2003 | Yang et al. |
| 6,585,159 B1 | 7/2003 | Meier et al. |
| 6,598,797 B2 | 7/2003 | Lee |
| 6,606,171 B1 | 8/2003 | Renk et al. |
| 6,634,558 B1 | 10/2003 | Patel et al. |
| 6,637,658 B2 | 10/2003 | Barber et al. |
| 6,655,595 B1 | 12/2003 | Longacre, Jr. et al. |
| 6,661,521 B1 | 12/2003 | Stern |
| 6,665,012 B1 | 12/2003 | Yang et al. |
| 6,714,239 B2 | 3/2004 | Guidash |
| 6,714,665 B1 | 3/2004 | Hanna et al. |
| 6,722,569 B2 | 4/2004 | Ehrhart et al. |
| 6,729,548 B2 | 5/2004 | Roustael |
| 6,732,929 B2 | 5/2004 | Good et al. |
| 6,732,930 B2 | 5/2004 | Puech et al. |
| 6,736,321 B2 | 5/2004 | Tsikos et al. |
| 6,739,511 B2 | 5/2004 | Tsikos et al. |
| 6,742,707 B1 | 6/2004 | Tsikos et al. |
| 6,832,729 B1 | 12/2004 | Perry et al. |
| 6,837,432 B2 | 1/2005 | Tsikos et al. |
| 6,854,649 B2 | 2/2005 | Worner et al. |
| 6,857,570 B2 | 2/2005 | Jankevics et al. |
| 6,858,159 B2 | 2/2005 | Lyons |
| 6,860,428 B1 | 3/2005 | Dowling et al. |
| 6,863,216 B2 | 3/2005 | Tsikos et al. |
| 7,178,733 B2 | 2/2007 | Zhu et al. |
| 2002/0125317 A1 | 9/2002 | Hussey et al. |
| 2002/0135683 A1 * | 9/2002 | Tamama ................... 348/222 |
| 2002/0135863 A1 | 9/2002 | Tamama et al. |
| 2002/0158127 A1 | 10/2002 | Hori et al. |
| 2003/0062418 A1 | 4/2003 | Barber et al. |
| 2004/0195328 A1 | 10/2004 | Barber et al. |
| 2004/0262392 A1 | 12/2004 | Longacre et al. |
| 2005/0056699 A1 | 3/2005 | Meier et al. |
| 2005/0103851 A1 | 5/2005 | Zhu et al. |
| 2006/0126129 A1 | 6/2006 | Barber et al. |
| 2006/0203092 A1 | 9/2006 | Nobori et al. |
| 2007/0012777 A1 | 1/2007 | Tsikos et al. |
| 2007/0040035 A1 | 2/2007 | Kotlarsky et al. |

FOREIGN PATENT DOCUMENTS

| | | |
|---|---|---|
| JP | 53-76047 | 6/1978 |
| JP | 02-144786 | 8/1990 |
| JP | 08-171604 | 7/1996 |
| JP | 08-235298 | 9/1996 |
| JP | 09-034982 | 2/1997 |
| JP | 200092317 * | 3/2000 |
| JP | 2000-192317 A | 3/2000 |
| JP | 2002/563413 | 1/2002 |
| WO | WO 93/04442 | 3/1993 |
| WO | WO 93/14458 | 7/1993 |
| WO | WO 93/17397 | 9/1993 |
| WO | WO 93/18478 | 9/1993 |
| WO | WO 95/32580 | 11/1995 |
| WO | WO 97/08647 | 3/1997 |
| WO | WO 99/22335 A1 | 5/1999 |
| WO | WO 01/26036 A3 | 4/2001 |
| WO | WO 01/26036 A2 | 4/2001 |
| WO | WO 02/063543 A3 | 8/2002 |
| WO | WO 02/063543 A2 | 8/2002 |

OTHER PUBLICATIONS

Tian, Hui et al., "Analysis of 1/f Noise in Switched MOSFET Circuits," Information Systems Laboratory, Electrical Engineering Department, Stanford University, Stanford, California 94305, 21 pp.

El Gamal, Professor A., Lecture Notes 1, 2, 4, 5, 6, 7, 10 and Handout #3 and #28, "Image Sensors and Digital Cameras" for EE 392B, Spring 2001.

Fossum, Eric R., CMOS Active Pixel Image Sensors, Nuclear Instruments and Methods in Physics Research A 395 (1997) 291–197.

EP Application No. 02 723 063.0–2210. Communication Pursuant to Article 96(2) EPC dated Dec. 11, 2003.

EP Application No. 02 723 063.0–2210. Communication Pursuant to Article 96(2) and Rule 51(2) EPC dated Apr. 27, 2004.

U.S. Appl. No. 10/887,207, filed Jul. 8, 2004, Longacre.

U.S. Appl. No. 11/238,176, filed Sep. 28, 2005, Charles P. Barber et al. no action.

U.S. Appl. No. 10/982,393, filed Nov. 5, 2004, Biss et al. not examined yet.

U.S. Appl. No. 10/938,416, filed Sep. 10, 2004, Fitch et al. not examined yet.

European Search Report for European Patent Application No. 06 015 349.1 dated Sep. 26, 2006, (6 pgs).

Claim set of U.S. Appl. No. 11/637,231, filed Dec. 11, 2006 (1pg).

EP Application No. 02723063.0–2210, Summons To Attend Oral Proceeding, date Jul. 1, 2005, received from Foreign Associate Jul. 5, 2005.

Symbol Technologies, Inc., LS 4800 Series Product Reference Guide, May 1996, Holtsville, NY.

Claims 1–40 of Application No. (Not Yet Assigned), Bar Code Reading Device Having Partial Frame Image Capture Operating Mode, Express Mail Label NO. EV554215873US, Filed Sep. 28, 2005.

New claims 66–77 of U.S. Appl. No. 10/801,937, Optical Reader Processing Two–Dimensional Electronic Representation, Filed Mar. 16, 2004, Claims filed with Amendment Dated Aug. 15, 2005.

WL1070 Engineering Evaluation Kit Specification, Sep. 27, 1994, V1.1, pp. 1–5.

Marshall Electronics, Optical Systems Division, Monochrome Monolithic Image Sensor WIth Analogue and Digital Outputs WL1070 Specification, Believed to be published In 1994, pp. 1–24.

VLSI Vision Ltd., High Resolution EIA/CCIR Monochrome Camera Specification, WL–1060, Apr. 1994, pp. 1–23.

VLSI Vision Ltd., Serial Interface Specification, WL–1060, Apr. 1994, pp. 1–9.

Sony Corporation, ICX084AL, Technical Specification, Believed to be published prior to Jan. 22, 2000.

European Patent Office, Office Action dated Feb. 14, 2006, Application No. 20 723 063.0, Publication No. EP1354291 A2, Publication date Oct. 22, 2003, 8 pages.

Claims 1–4 as of Mar. 6, 2006, Application No. 02 723 063.0, Publication No. EP1354291 A2, Publication date Oct. 22, 2003.

"*Dual Slope Dynamic Range Expansion*" from FillFactory NV, Schallënhoeyedreef 20B, B–2800 Mechelen, Beligum, Http://www.fillfactory.com/htm/technology/htm/dual–slope.htm, pp. 1–2, 2000.

"Device Performance Specification –Kodak KAC–9630 CMOS Image Sensor," Sep. 2004, revision 1.1, Http://www.kodak.com/global/plugins/acrobat/en/digital/ccd/products/cmos/KAC–9630LongSpec.pdf. pp. 1–22.

*Micron's Wide VGA MT9V022 Image sensor from Micron Technology, Inc., 8000 South Federal Way, Post Office Box 6, Boise, ID 83707–0006*, http://download.micro.com/pdf/flyers/mt9v022 (mi–0350) flyer,pdf, pp. 1–2, 2004.

*Auto focus systems and algorithms are described in more detail on the webpage maintained at the address* http://www.cs.mtu.edu/~shene/DigiCam/User–Guide/5700/AUTO–FOCUS/Auto–Focus.html, pp. 1–4, 2004.

*A CompactFlash Interface is an interface designed in accordance with the CompactFlash standard as described in the compactFlash Specification version 2.0 maintained at the websit* http://www.compactflash.org, pp. 1–2, 2003.

*PC Card Standard 8.0 Release –Apr. 2001 maintained by the Personel Computer Memory Card International Association (PCMCIA) and available through the website at* http://www.pcmcia,org. pp. 1–2.

U.S. Patent and Trademark Office, Office Action received Feb. 27, 2006, U.S. Appl. No. 10/651,298 filed Aug. 28, 2003, 15 pages.

Pending claims as of Mar. 24, 2006, U.S. Appl. No. 10/651, 298, filed Aug. 28, 2003, 6 pages.

* cited by examiner

OPTICAL READER HAVING REDUCED PARAMETER DETERMINATION DELAY

FIELD OF THE INVENTION

The present invention relates to optical readers in general and in particular to a method for reducing a parameter determination delay of an optical reader.

BACKGROUND OF THE PRIOR ART

Prior to commencing comprehensive image data processing, which may include searching for symbol or character representations, decoding and character recognition processing, presently available optical readers clock out and capture in a memory location at least one exposure test frame of image data, read pixel data from the memory-stored exposure test frame to determine an exposure parameter value that is based on actual illumination conditions, then utilize the exposure parameter value in the exposure of a frame of image data that is clocked out, and then subjected to searching, decoding, and/or character recognition processing. The frame of image data exposed utilizing the exposure parameter based on acutal illumination conditions is not available for reading until after it is clocked out. Presently available optical readers therefore exhibit an appreciable inherent exposure parameter determination delay. Readers having higher resolution imagers have slower frame clock out rates and therefore longer exposure parameter determination delays.

There is a growing demand for higher resolution optical readers, including optical readers that incorporate mega pixel image sensors. Accordingly, there is growing need to address the parameter determination delay problem associated with presently available optical readers.

SUMMARY OF THE INVENTION

According to its major aspects and broadly stated, the present invention is a method for controlling an optical reader to reduce the reader's parameter determination delay. According to the invention, an image sensor is adapted to clock out image data from an image sensor according to two modes of operation, a "low resolution" clock out mode of operation and a "normal resolution" clock out mode of operation.

In a low resolution mode, some pixels of the reader's image sensor pixel array are clocked out at a normal clock out speed sufficient to develop electrical signals that accurately represent the intensity of light incident on the pixel array, while other pixels of the array are either not clocked out or are clocked out at a higher clock out rate which is insufficient to allow development of electrical signals that accurately represent the intensity of light at the respective pixels but which nevertheless, result in an increase in the overall frame clock out rate of the frame of image data. In a normal resolution mode of operation the image sensor is caused to clock out electrical signals corresponding to each pixel of the array at a constant "normal mode" speed which is a speed sufficient to ensure that the electrical signal corresponding to each pixel accurately represents the intensity of light incident on the pixel.

An optical reader according to the invention operates an image sensor in a low resolution mode of operation in order to clock out and capture a parameter-determining frame of image data at high speed, reads pixel data from the parameter determination frame to determine an operation parameter based on actual illumination conditions, then utilizes the operation parameter in operating an image sensor according to high resolution mode in the clocking out of a succeeding frame of image data that is captured and subjected to comprehensive image data processing which may include image data searching, decoding, and/or recognition processing. Clocking out some of the pixels of an array at high speed during execution of the low resolution mode significantly decreases the reader's parameter determination delay.

These parameters determined by reading pixel values from a low resolution parameter determination frame of image data according to the invention may include an exposure time parameter, an amplification parameter for controlling amplification of an electrical signal prior to its analog to digital conversion, an illumination level parameter (intensity or period of illumination), a dark or light level adjustment parameter and an analog-to-digital converter reference voltage parameter for adjusting the high and/or low reference voltages of the reader's analog to digital converter.

These and other details, advantages and benefits of the present invention will become apparent from the detailed description of the preferred embodiment hereinbelow.

DETAILED DESCRIPTION OF THE INVENTION

When operated to generate valid pixel data, presently available optical reading devices clock out electrical signals corresponding to pixel positions of an image sensor at a uniform clock out rate such that the electrical signal corresponding to each pixel of the image sensor array accurately represents light incident on the pixel.

By contrast, an image sensor of the present invention is made to operate under two major frame capture modes, a "low resolution" frame clock out mode and a "normal resolution" frame clock out mode. In a "low resolution" mode of operation, an image sensor according to the invention is operated to clock out electrical signals corresponding to some pixels of an image sensor array at a high clock out rate and other pixels of the image sensor at a normal clock out rate. Clocking out a portion of the electrical signals using a faster than normal clock out rate results in a reduction in the overall frame clock out time while clocking out a portion of the signals at a normal clock out rate enables the generation of pixel data sufficient to enable determination of parameter settings for use in subsequent frame captures. In a "normal resolution" mode of operation the image sensor is operated to clock out electrical signals corresponding to pixels of the array using a single uniform clock out speed as in prior art readers. The low resolution mode of operation may also be carried out by clocking out electrical signals corresponding to only a portion of a frame's pixels and not clocking out electrical signals corresponding to the remaining pixels.

A reader configured in accordance with the invention clocks out and captures in a memory storage location at least one parameter determination frame of image data in a "low resolution" frame capture mode, reads pixels of the parameter determination frame in establishing at least one operation parameter that is based on actual illumination conditions, utilizes the determined operation parameter in clocking out a subsequent frame of image data in a "normal resolution mode," then captures and subjects the frame of image data clocked out utilizing the operation parameter to image data searching, decoding, and/or recognition processing. The reader may be adapted to decode a decodable symbol represented in a frame of image data developed utilizing a determined operating parameter.

An optical reading system is which the invention may be employed is described with reference to the block diagram of FIG. 2a.

Figure 2A:
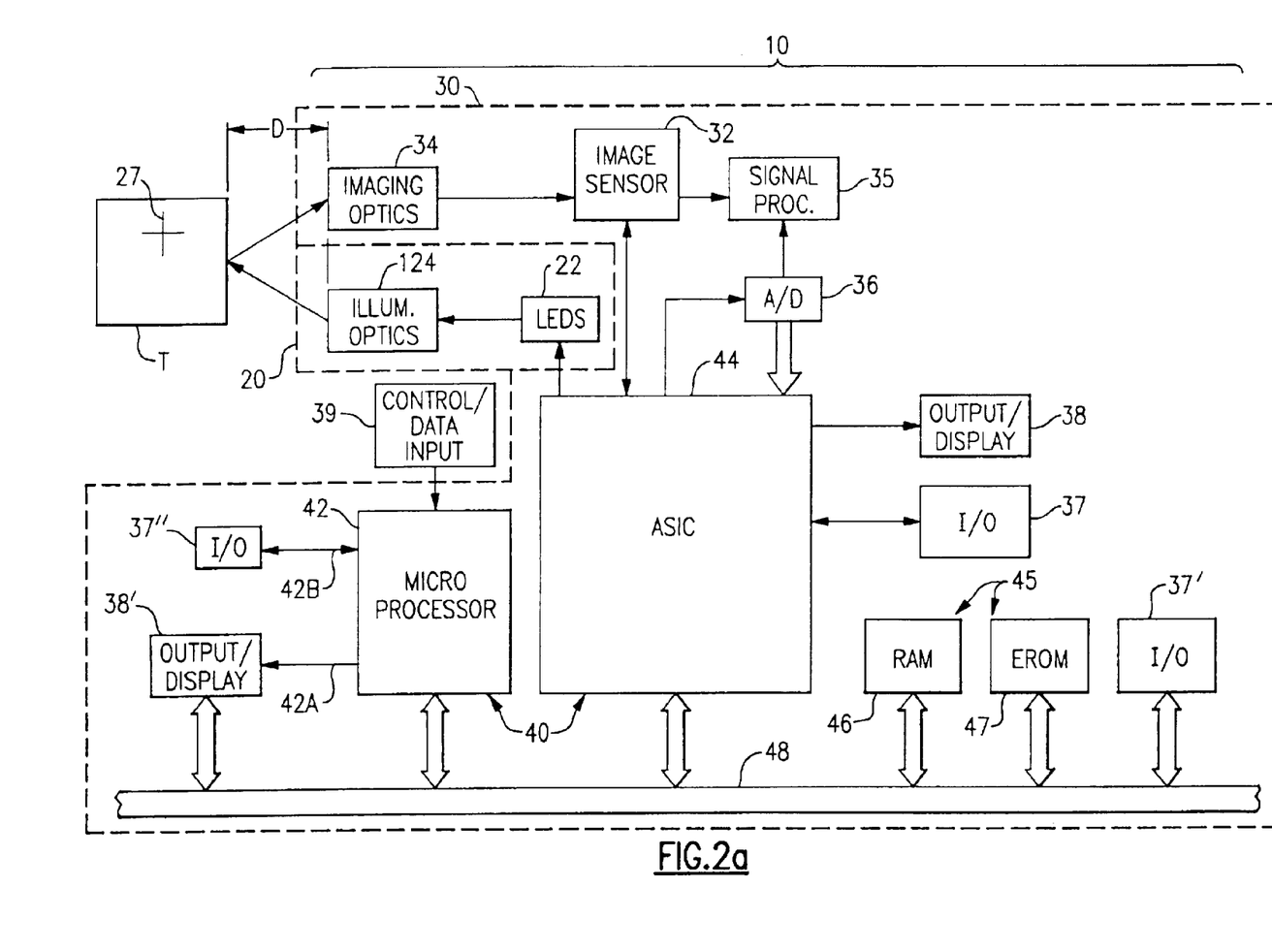
FIG. 2a is a block diagram of an optical reader of a type in which the invention may be incorporated.
Figure 2B:
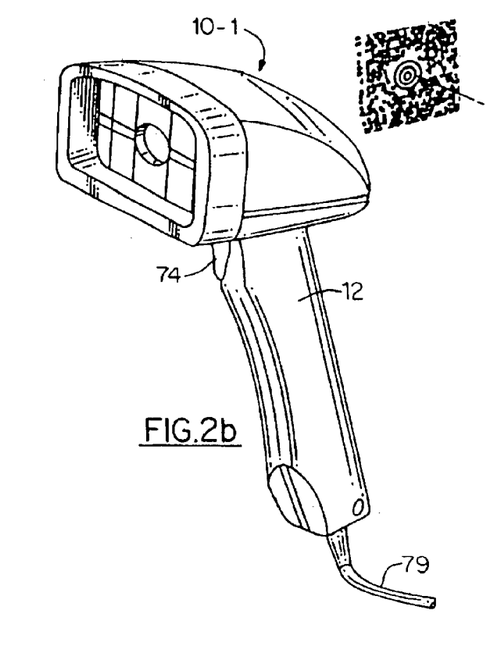
FIGS. 2b–2h show various types of optical reader housings in which the invention may be incorporated.
Figure 2C:
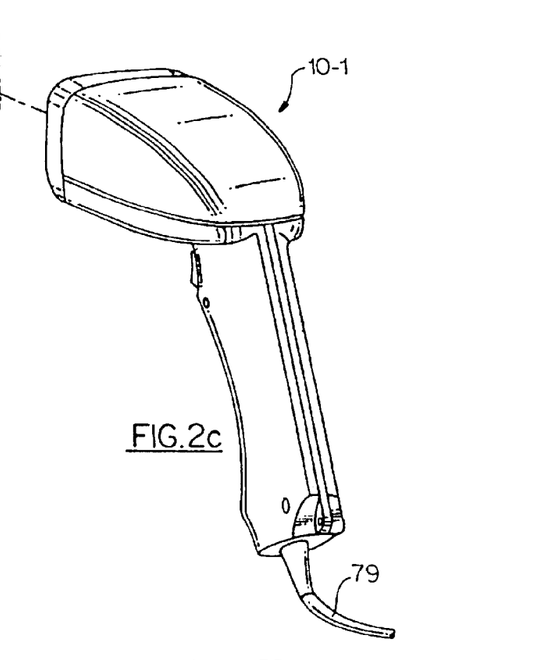
Figure 2D:
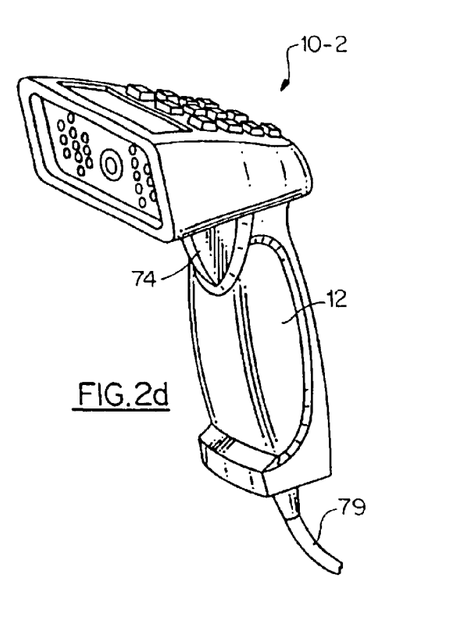
Figure 2E:
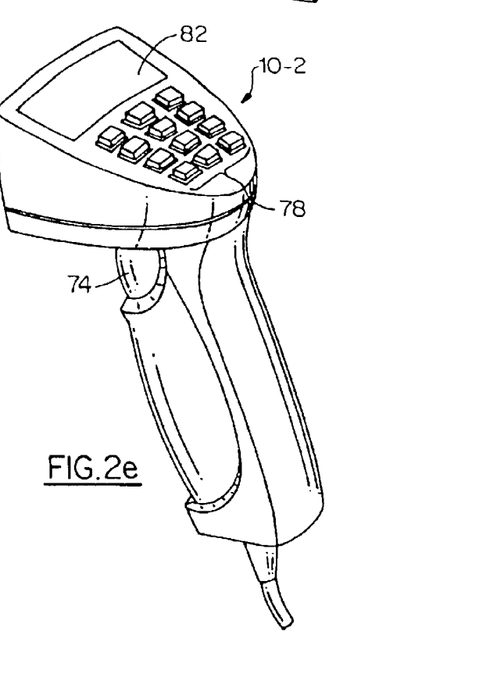
Figures 2F, 2G:
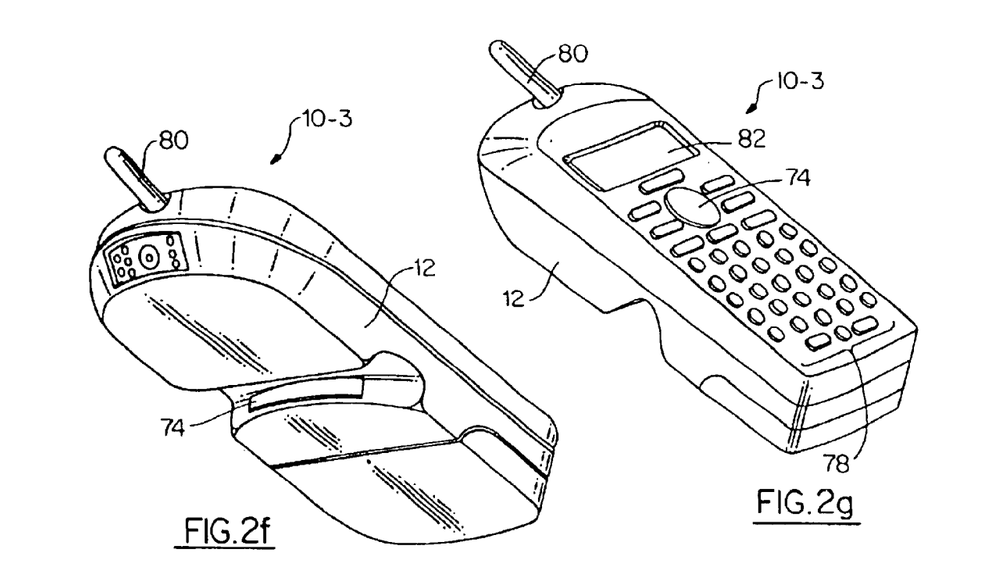

Optical reader 10 of FIG. 2a also includes programmable control circuit 40 which preferably comprises an integrated circuit microprocessor 42 and an application specific integrated circuit (ASIC 44). The function of ASIC 44 could also be provided by field programmable gate array (FPGA). Processor 42 and ASIC 44 are both programmable control devices which are able to receive, output and process data in accordance with a stored program stored in memory unit 45 which may comprise such memory elements as read/write random access memory or RAM 46 and an erasable read only memory or EROM 47. RAM 46 typically includes at least one volatile memory device but may include one or more long term non-volatile memory devices. Processor 42 and ASIC 44 are also both connected to a common bus 48 through which program data and working data, including address data, may be receive and transmitted in either direction to any circuitry that is also connected thereto. Processor 42 and ASIC 44 differ from one another, however, in how they are made and how they are used.

Optical reader 10 includes an illumination assembly 20 for illuminating a target object T, such as a 1D or 2D bar code symbol, and an imaging assembly 30 for receiving an image of object T and generating an electrical output signal indicative of the data optically encoded therein. Illumination assembly 20 may, for example, include an illumination source assembly 22, together with an illuminating optics assembly 24, such as one or more lenses, diffusers, wedges, reflectors or a combination of such elements, for directing light from light source 22 in the direction of a target object T. Illumination assembly 20 may comprise, for example, laser or light emitting diodes (LEDs) such as white LEDs or red LEDs. Illumination assembly 20 may include target illumination and optics for projecting an aiming pattern 27 on target T. Illumination assembly 20 may be eliminated if ambient light levels are certain to be high enough to allow high quality images of object T to be taken. Imaging assembly 30 may include an image sensor 32, such as a 1D or 2D CCD, CMOS, NMOS, PMOS, CID OR CMD solid state image sensor, together with an imaging optics assembly 34 for receiving and focusing an image of object T onto image sensor 32. The array-based imaging assembly shown in FIG. 2a may be replaced by a laser array based imaging assembly comprising multiple laser sources, a scanning mechanism, emit and receive optics, at least one photodetector and accompanying signal processing circuitry.

Optical reader 10 of FIG. 2a also includes programmable control circuit 40 which preferably comprises an integrated circuit microprocessor 42 and an application specific integrated circuit (ASIC 44). The function of ASIC 44 could also be provided by field programmable gate array (FPGA). Processor 42 and ASIC 44 are both programmable control devices which are able to receive, output and process data in accordance with a stored program stored in memory unit 45 which may comprise such memory elements as read/write random access memory or RAM 46 and an erasable read only memory or EROM 47. RAM 46 typically includes at least one volatile memory device but may include one or more long term non-volatile memory devices. Processor 42 and ASIC 44 are also both connected to a common bus 48 through which program data and working data, including address data, may be receive and transmitted in either direction to any circuitry that is also connected thereto. Processor 42 and ASIC 44 differ from one another, however, in how they are made and how they are used.

More particularly, processor 42 is preferably a general purpose, off-the-shelf VLSI integrated circuit microprocessor which has overall control of the circuitry of FIG. 2a, but which devotes most of its time to decoding image data stored in RAM 46 in accordance with program data stored in EROM 47. Processor 44, on the other hand, is preferably a special purpose VLSI integrated circuit, such as a programmable logic or gate array, which is programmed to devote its time to functions other than decoding image data, and thereby relieve processor 42 from the burden of performing these functions.

The actual division of labor between processors 42 and 44 will naturally depend on the type of off-the-shelf microprocessors that are available, the type of image sensor which is used, the rate at which image data is output by imaging assembly 30, etc. There is nothing in principle, however, that requires that any particular division of labor be made between processors 42 and 44, or even that such a division be made at all. This is because special purpose processor 44 may be eliminated entirely if general purpose processor 42 is fast enough and powerful enough to perform all of the functions contemplated by the present invention. It will, therefore, be understood that neither the number of processors used, nor the division of labor there between, is of any fundamental significance for purposes of the present invention.

With processor architectures of the type shown in FIG. 2a, a typical division of labor between processors 42 and 44 will be as follows. Processor 42 is preferably devoted primarily to such tasks as decoding image data, once such data has been stored in RAM 46, recognizing characters represented in stored image data according to an optical character recognition (OCR) scheme, handling menuing options and reprogramming functions, processing commands and data received from control/data input unit 39 which may comprise such elements as trigger 74 and keyboard 78 and providing overall system level coordination.

Processor 44 is preferably devoted primarily to controlling the image acquisition process, the A/D conversion process and the storage of image data, including the ability to access memories 46 and 47 via a DMA channel. Processor 44 may also perform many timing and communication operations. Processor 44 may, for example, control the illumination of LEDs 22, the timing of image sensor 32 and an analog-to-digital (A/D) converter 36, the transmission and reception of data to and from a processor external to reader 10, through an RS-232, a network such as an Ethernet, a serial bus such as USB, a wireless communication link (or other) compatible I/O interface 37. Processor 44 may also control the outputting of user perceptible data via an output device 38, such as a beeper, a good read LED and/or a display monitor which may be provided by a liquid crystal display such as display 82. Control of output, display and I/O functions may also be shared between processors 42 and 44, as suggested by bus driver I/O and output/display devices 37' and 38' or may be duplicated, as suggested by microprocessor serial I/O ports 42A and 42B and I/O and display devices 37" and 38'. As explained earlier, the specifics of this division of labor is of no significance to the present invention.

FIGS. 2b through 2g show examples of types of housings in which the present invention may be incorporated. FIGS. 2b–2g show 1D/2D optical readers 10-1, 10-2 and 10-3. Housing 12 of each of the optical readers 10-1 through 10-3 is adapted to be graspable by a human hand and has incorporated therein at least one trigger switch 74 for activating image capture and decoding and/or image capture and character recognition operations. Readers 10-1 and 10-2 include hard-wired communication links 79 for communication with external devices such as other data collection devices or a host processor, while reader 10-3 includes an antenna 80 for providing wireless communication device or a host processor.

In addition to the above elements, readers 10-2 and 10-3 each include a display 82 for displaying information to a user and a keyboard 78 for enabling a user to input commands and data into the reader.

Figure 2H:
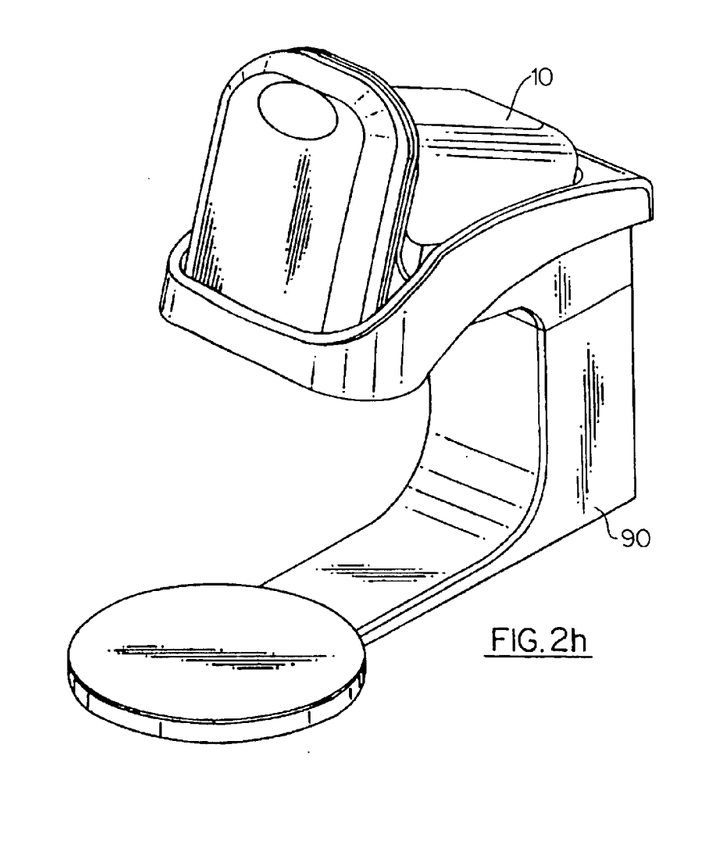

Any one of the readers described with reference to FIGS. 2b through 2g may be mounted in a stationary position as is illustrated in FIG. 2h showing a generic optical reader 10 docked in a scan stand 90. Scan stand 90 adapts portable optical reader 10 for presentation mode scanning. In a presentation mode, reader 10 is held in a stationary position and an indicia bearing article is moved across the field of view of reader 10.

As will become clear from the ensuing description, the invention need not be incorporated in a portable optical reader. The invention may also be incorporated, for example, in association with a control circuit for controlling a nonportable fixed mount imaging assembly that captures image data representing image information formed on articles transported by an assembly line, or manually transported across a checkout counter at a retail point of sale location. Further, in portable embodiments of the invention, the reader need not be hand held. The reader may be part or wholly hand worn, finger worn, waist worn or head worn for example.

Referring again to particular aspects of the invention, a low resolution frame clock out mode of the invention is described in detail with reference to the pixel maps of FIGS. 1a and 1b. Control circuit 40 establishes a clock out rate for clocking out an electrical signal corresponding to a pixel of an image sensor 32 by appropriate state control of control signals in communication with image sensor 32. In the present invention, image sensor 32 is selected to be of a type whose pixel clock out rate can be varied by way of control signals received from control circuit 40. In presently available optical readers, an image sensor's pixel clock out rate is not changed during the course of clocking out of a frame of image data.

In a "low resolution" frame clock out mode of the invention, however, control circuit 40 causes image sensor 32 to clock out electrical signals corresponding to the pixels of the array at least two speeds during a single frame capture period. During a single frame clock out period, control circuit 40 controls image sensor 32 so that some pixels are clocked out at normal clock out rate sufficient to develop electrical signals accurately representing the intensity of light at the respective pixel positions, while other pixels are either not clocked out or are clocked out at a clock out rate which may be insufficient to allow development of electrical signals that accurately represent the intensity of light at the respective pixels but which nevertheless results in a reduction of the overall frame clock out time of the frame of image data being clocked out.

Figure 1A:
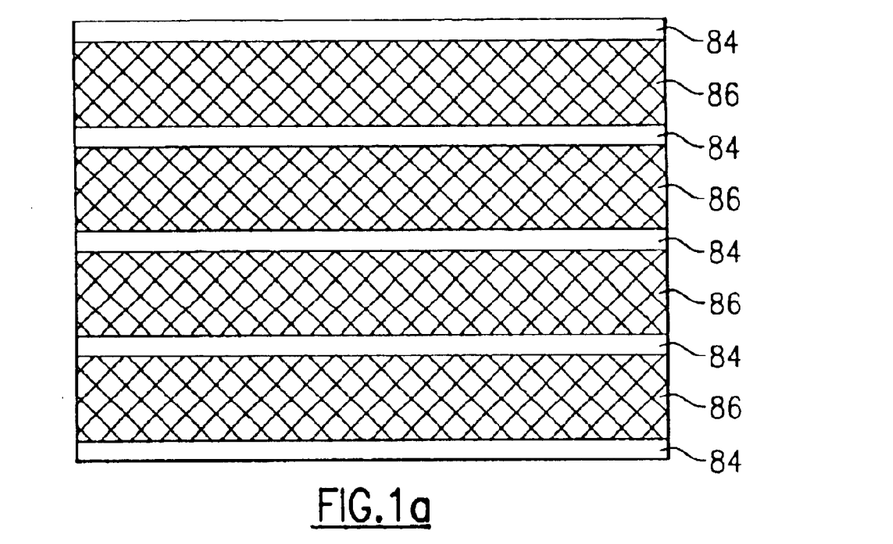
FIGS. 1a and 1b are image maps illustrating possible low resolution frames of image data clock out during a low resolution frame clock out mode of the invention.

FIG. 1a shows a schematic diagram of an exemplary image map frame that is clocked out according to the low resolution frame clock out mode of the invention and then captured into memory 45. The image map is divided into "zones" of valid data and invalid data. Valid zones 84 shown are rows of pixels that are clocked out at a normal clock out speed while invalid zones 86 shown are rows of pixels that are clocked out at a faster clock out speed, which is normally (but not necessarily) a speed insufficient to allow development of electrical signals accurately representing the intensity of light at a pixel.

Figure 1B:
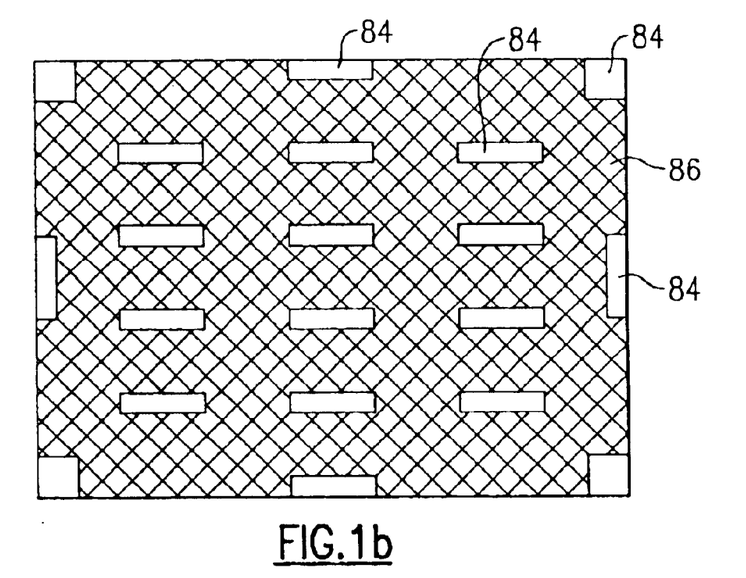

FIG. 1b shows another possible division of an image map into valid zones and invalid zones. This type of embodiment in which valid zones 84 comprise less than full pixel rows is conveniently realized by appropriate control of an image sensor manufactured using CMOS fabrication methods. Using CMOS fabrication methods, an image sensor can be merged with a microprocessor, an ASIC, or another timing device on a single die to the end that a preestablished clocking sequence in which a pixel clock out rate is changed multiple times during the course of clock out a frame of image data may be actuated in response to the activation of a single control signal in communication with image sensor 32.

Using CMOS fabrication techniques, image sensors are readily made so that electrical signals corresponding to certain pixels of a sensor can be selectively clocked out without clocking out electrical signals corresponding to remaining pixels of the sensor. CMOS image sensors are available from such manufacturers as Symagery, Pixel Cam, Omni Vision, Sharp, Natural Semiconductor, Toshiba, Hewlett-Packard and Mitsubishi. Further aspects of a partial frame clock out mode are described in commonly assigned application Ser. No. 09/766,806 entitled "Optical Reader Having Partial Operating Mode" now U.S. Pat. No. 6,637,658 filed concurrently herewith and Frame incorporated herein by reference.

The invention is also conveniently realized with use of an image sensor having an image sensor discharge function. Image sensors having a discharge function are typically adapted to receive a discharge clock out signal which when active results in all pixels of a frame being read out at a high clock out rate insufficient to allow development of electrical signals. In presently available readers having a directional function, a control circuit sets the discharge clocking signal to an active state while clocking out an initial "discharge period" frame of image data immediately after reception of a trigger actuation. This initial discharge process removes any residual charges built up on image sensor 32 prior to capturing a first frame including valid pixel data.

For producing an image map divided into valid and invalid zones using an image sensor having a discharge function, control circuit 40 may be made to intermittently change the state of a discharge clock out signal during a frame clock out period during which image sensor 32 is otherwise operated according to a normal resolution clock out mode.

Figure 3A:
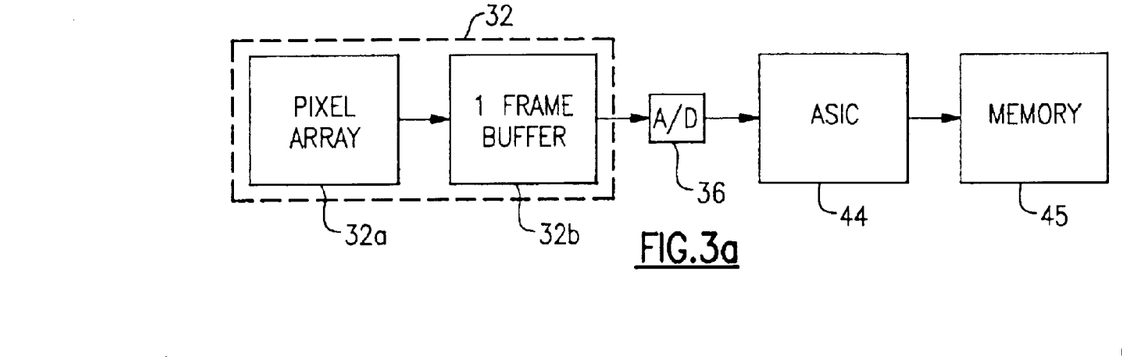
FIG. 3a is a process flow diagram illustrating frame clocking operations in an optical reader having an image sensor including a one-frame buffer.
Figure 3B:
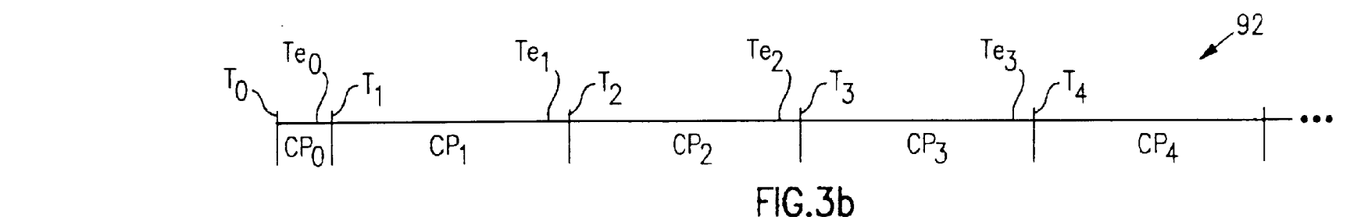
FIG. 3b is a time line illustrating frame clock out operations in a prior art optical reader.
Figure 3C:
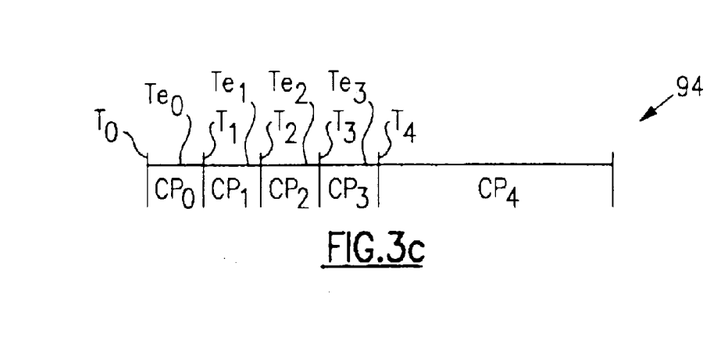
FIG. 3c is a time line illustrating a frame clock out of operations in an optical reader operated according to the invention.

An exemplary embodiment of the invention in which the invention is employed in a reader equipped with a SONY ICX084AL CCD image sensor (that includes a one frame analog buffer memory) and a SONY CXD2434TQ timing generator is described with reference to FIGS. 3a, 3b and 3c. FIG. 3a shows a flow diagram, of an imaging system in which the image sensor includes a one frame buffer memory. For purposes of illustrating the advantages of the invention, FIG. 3b shows a time line illustrating the time required to clock out and capture a frame of image data useful for searching and decoding in a prior art reader having a buffer memory not configured to operate in accordance with a low resolution frame clock out mode. FIG. 3c shows a time line illustrating the time required to clock out and capture a frame of image data useful for searching, decoding, and recognizing characters in a reader having a buffer memory configured to operate in a low resolution frame clock out mode according to the invention.

When a reader includes a one frame buffer memory, then the activation of an appropriate frame clock out signal by image sensor 32 causes electrical charges representative of light on pixels of an image sensor's pixel array 32a to be transferred to analog buffer memory 32b and causes electrical signals corresponding to pixel value storage locations of buffer 32b (representing light on the pixels during a previous timing period) to be clocked out to analog to digital converter 36 so that the frame of image data stored on buffer memory can be captured in memory 45, wherein the data may be read by control circuit 40.

Referring to time line 92 corresponding a prior art reader it can be seen that a substantial parameter determination delay is present without use of a low resolution frame capture mode according to the invention. At time T0, control circuit 40 activates a frame discharge control signal so that residual charges built up in the storage locations of buffer memory 32b are eliminated or "cleaned" during clock out period CP0.

At time T1, control circuit 40 activates a frame clocking signal to commence the clock out a first frame of pixel data according to a normal resolution frame clock out mode (the pixel data clocked out during clock out period CP1 is normally invalid pixel data). During clock out period CP1, the charges built upon pixel array 32a during clock out period CP0 are transferred to buffer memory 32b and then clocked out to A/D converter 36. Also during clock out period CP1 pixel array 32a is exposed to light for a time determined by an exposure parameter value, $e_0$, that was previously transmitted at time $Te_0$ prior to time T1. The exposure parameter $e_0$ is based on previous exposure values during a previous trigger actuation period or based on expected illumination conditions, but is not based on actual illumination conditions present.

At time T2, control circuit 40 activates a frame clock out signal to commence the clock out of a second frame of image data in accordance with a normal resolution frame clock out mode. During clock out period CP2, the charges built up on pixel array 32a during clock out period CP1 are transferred to buffer memory 32b and then clocked out to A/D converter 36. Also during clock out period CP2 pixel array 32 is exposed to light for a time determined by an exposure parameter value, $e_1$, that was previously transmitted at time $Te_1$ prior to time T2. The exposure parameter $e_1$, like exposure parameter $e_0$, also cannot be based on actual illumination conditions since the most recent frame image data available for reading by circuit 40 prior to the transmittal of exposure parameter $e_1$ is the invalid frame data resulting from transmittal of frame discharge signal at time T0.

At time T3, control circuit 40 activates a frame clock out signal to commence the capture of a third frame of image data in accordance with a normal resolution frame clock out mode. During clock out period CP3, the charges built up on pixel array 32a during clock out period CP2 are transferred to buffer memory 32b and then clocked out to A/D converter 36. Also during clock Out period CP3, pixel array 32a is exposed to light for a time determined by an exposure parameter value, $e_2$, that was previously transmitted at time $Te_2$ prior to time T3. Unlike the previous exposure values $e_0$ and $e_1$, the exposure parameter value $e_2$ can be a value determined from actual illumination conditions since the frame of image data resulting from pixel array 32a being exposed to light during clock out period CP1, is available for reading by control circuit 40 prior to the time that the exposure parameter $e_2$ must be communicated to image sensor 32. However, because of the built in one frame delay resulting from the presence of buffer 32b, it is seen that a frame of image data clocked out while being exposed with the exposure parameter value $e_2$, determined based on actual illumination conditions, will not be available for reading by control circuit unit after the expiration of clocking period CP4. Accordingly, it can be seen that the above reader exhibits a typical parameter determination delay of four normal resolution clock out periods, CP1+CP2+CP3+CP4 plus the frame discharge clock out parameter CP0. The normal resolution frame clock out period of the above-referenced SONY image sensor is about 33.37 ms and the frame discharge period is about 8.33 ms, resulting in a typical-case total parameter determination delay in the example described of 140 ms (an earlier frame may be subjected to image data searching, decoding, and recognition if $e_0$ or $e_1$ yields an image of acceptable quality).

Advantages of operating image sensor 32 according to a low resolution frame clock out mode of operation are easily observable with reference to time line 94 corresponding to a reader having an image sensor operated in accordance with a low resolution frame clock out mode. In the example illustrated by time line 94 control circuit 40 operates image sensor as described in connection with FIG. 3b except that control circuit 40 operates image sensor 32 according to a low resolution frame clock out mode during clocking periods CP1, CP2, and CP3. Because electrical signals corresponding to only some of the pixels during these timing periods are clocked out at speeds sufficiently slow to read valid image data, the total frame clock out time associated with these clocking periods is significantly shorter than that of a frame clocked out according to a normal resolution frame clock out mode. In an exemplary embodiment in which control circuit 40 alternatingly changes the state of a discharge clock out control signal (known as an EFS signal) in communication with a SONY ICX084AL CCD image sensor, to result in a zone division pattern having valid zones comprising four pixel rows clocked out at normal speed bounded by invalid rows having eighteen rows of pixels clocked out at high speed, the low resolution frame clock out rate is 8.52 ms. The overall typical parameter determination delay is therefore reduced to T0+T1+T2+T3+T4=66.2 ms as compared to the 140 ms delay in the prior art reader example described with reference to FIG. 3a.

In the example described in which image sensor 32 comprises a one frame buffer 32b, pixel array 32a is exposed to light for at least some time currently as electrical signals are clocked out from buffer 32b. In the control of presently available image sensors that do not have one frame buffers, frame clock out periods normally follow frame exposure periods without overlapping the exposure periods.

A low resolution parameter determination frame of image data clocked out using a low resolution clock out mode is useful for determining an exposure control parameter because exposure parameter values can be accurately determined by sampling only a small percentage of pixel values from a frame of image data. In fact, for improving the processing speed of an optical reader it is preferred to determine an exposure control value based on a sampling of a small percentage of pixel values from a frame of image data. The proper exposure parameter setting varies substantially linearly with illumination conditions, and therefore is readily determined based on a sampling of pixel values from a single frame of image data.

Additional reader operating parameters can be determined by reading pixel values from a frame of image data clocked out according to a low resolution clock out mode of the invention. These additional parameters which may be determined from a low resolution parameter determining frame of image data include an amplification parameter for adjusting the gain of an amplifier prior to analog-to-digital conversion, an illumination level parameter for adjusting the current level delivered to, and therefore the radiance of light emitted from LEDs 22, an illumination time parameter for adjusting the on-time of LEDs 22, a light level parameter for adjusting a light level of a subsequently captured frame of image data, a dark level parameter for adjusting a dark level, of a subsequently captured frame of image data, and an analog-to-digital converter reference parameter for adjusting a reference voltage of analog-to-digital converter 36.

While the present invention has been explained with reference to the structure disclosed herein, it is not confined to the details set forth and this invention is intended to cover any modifications and changes as may come within the scope of the following claims:

What is claimed is:

1. A method for operating an optical reader having an image sensor, said method comprising the steps of:
   switching operation of said reader to a low resolution mode of operation; and
   in said low resolution mode, clocking out electrical signals corresponding to some pixels of said image sensor at a higher than normal clock out rate so that an overall frame clock out rate is increased.

2. The method of claim 1, wherein said clocking out step includes the steps of clocking out some rows of said image sensor array at a normal clock out rate and other rows of said image sensor at a higher than normal clock out rate.

3. The method of claim 2, wherein said image sensor includes a discharge function actuated by activation of a discharge control signal, wherein said clocking out step includes the step of intermittently activating said discharge control signal while clocking out a frame of image data.

4. The method of claim 1, wherein said switching step includes the step of actuating a trigger to switch operation of said optical reader from an idle state.

5. The method of claim 1, wherein said low resolution clocking out step includes the step of utilizing a discharge clock out control signal.

6. The method of claim 1, wherein said low resolution mode clocking out step includes the step of utilizing a CCD image sensor.

7. The method of claim 1, wherein said low resolution clocking out step includes the step of utilizing a 2D CCD image sensor.

8. The method of claim 1, wherein said low resolution clocking out step includes the step of utilizing a CCD image sensor having a row of pixels.

9. The method of claim 1, wherein said low resolution clocking out step includes the step of utilizing a CMOS image sensor.

10. The method of claim 1, wherein said low resolution clocking out step includes the step of utilizing a 2D CMOS image sensor.

11. The method of claim 1, wherein said low resolution clocking out step includes the step of utilizing a 2D image sensor configured so that pixels of said image sensor may be selectively clocked out.

12. The method of claim 1, wherein said low resolution clocking out step includes the step of varying a pixel clock out rate of said image sensor with use of control signals input into, said image sensor.

13. The method of claim 1, wherein said image sensor is a 2D image sensor, and wherein said low resolution mode clocking out step includes the step of varying a pixel clock out rate of said image sensor during the source of clocking out a frame of image data.

14. The method of claim 1, wherein said low resolution clocking out step includes the steps of utilizing a 2D CCD image sensor, and of controlling a control signal input to said image sensor to vary a pixel clock out rate of said image sensor during the course of clocking out a frame of image data.

15. The method of claim 1, wherein said image sensor is a 2D image sensor having a plurality of rows of pixels, and wherein said low resolution clocking out step includes the step of clocking out electrical signals corresponding to at least one row of pixels of said image sensor at a normal clock out rate.

16. The method of claim 1, further including the step of reading valid pixel values of a frame of image data developed during said low resolution mode to determine an operation parameter of said optical reader.

17. The method of claim 16, wherein said reading to determine step includes the step of determining an illumination intensity parameter.

18. The method of claim 16, wherein said reading to determine step includes the step of determining a gain parameter.

19. The method of claim 16, wherein said reading to determine step includes the step of determining an illumination on-time parameter.

20. The method of claim 1, further including the step of reading valid pixel values of a frame of image data developed during operation of said reader in said low resolution mode to determine an operating parameter of said optical reader, utilizing said operating parameter to obtain a frame of image data, and decoding a decodable symbol represented in said frame of image data obtained utilizing said operating parameter.

21. The method of claim 1, wherein said method further includes the steps of reading valid pixel values of a frame of image data obtained during operation of said reader in said low resolution mode to determine an operating parameter of said optical reader.

22. The method of claim 1, wherein said method further includes the steps automatically changing operation of said optical reader to a normal resolution mode of operation after said optical reader clocks out predetermined number of low resolution frames of image data from image sensor while operating in said low resolution mode of operation.

23. The method of claim 1, wherein said method further includes the steps of automatically changing operation of said optical reader to a normal resolution mode of operation after an operating parameter of said optical reader is determined.

24. The method of claim 1, wherein said method further includes the step of automatically changing operation of said optical reader to a normal resolution mode of operation after a plurality of frames of image data are clocked out in said low resolution mode of operation, said optical reader having a frame clock out period of about 33.37 ms in said normal resolution mode of operation.

25. The method of claim 1, wherein said method further includes the step of automatically changing operation of said optical reader to a normal resolution mode of operation, said optical reader having a frame clock out period of about 33.37 ms in said normal resolution mode of operation.

26. The method of claim 1, wherein said low resolution clocking out step includes the step of clocking out electrical signals corresponding to pixels of said image sensor of at least two speeds during the course of clocking out a single frame of image data.

27. The method of claim 1, further including the steps of reading pixel values from at least one frame of image data developed in said low resolution mode of operation to determine an operating parameter, developing a subsequent frame of image data utilizing said operating parameter, and processing said subsequent frame of image data.

28. The method of claim 27, wherein said processing step includes image data decoding processing.

29. The method of claim 27, wherein said processing step includes image data decoding processing.

30. The method of claim 27, wherein said processing step includes image data recognition processing.

31. A method for operating an optical reader having a CCD image sensor, said method comprising the steps of:
(a) clocking out at least one frame of image data in a low resolution frame clock out mode of operation utilizing said CCD image sensor;
(b) reading pixel values from said at least one frame of image data clocked out in said low resolution clock out mode to determine an operating parameter of said reader;
(c) utilizing said operating parameter in developing a frame of image data; and
(d) decoding a decodable symbol representation represented in said frame of image data developed in step (c) utilizing said operating parameter.

32. The method of claim 31, wherein said low resolution mode clocking out step includes the step includes the step of clocking out electrical signals corresponding to some pixel values of said image sensor at a higher than normal clock out rate so that an overall frame clock out rate is increased.

33. The method of claim 31, wherein said low resolution mode clocking out step includes the steps of clocking out some rows of said image sensor at a normal clock out rate and other rows of said image sensor at a higher than normal clock out rate.

34. The method of claim 31, wherein said image sensor includes a discharge function actuated by activation of a discharge control signal, wherein said low resolution mode clocking out step includes the step of intermittently activating said discharge control signal while clocking out a frame of image data.

35. The method of claim 31, wherein said utilizing step includes the step of utilizing said operating parameter in developing a first frame of a succession of frames of image data clocked out by said optical reader that is not clocked out in said low resolution mode of operation.

36. The method of claim 31, wherein said utilizing step includes the step of communicating includes the step of communicating said operating parameter to said image sensor.

37. The method of claim 31, wherein said operating parameter is an exposure parameter value.

38. The method of claim 31, wherein said operating parameter is an illumination intensity value.

39. The method of claim 31, wherein said reading step includes the step of reading pixel values from a memory device.

40. The method of claim 31, wherein said operating parameter is an illumination on-time value.

41. The method of claim 31, wherein said operating parameter is an amplifier gain parameter value.

42. The method of claim 31, wherein said operating parameter is a dark level adjustment value.

43. The method of claim 31, wherein said operating parameter is a light level adjustment value.

44. The method of claim 31, further comprising the step of decoding a decodable symbol representation represented in a frame of image data developed utilizing said operating parameter.

45. The method of claim 31, wherein said low resolution mode clocking out step of producing a low resolution parameter determination frame of image data in which valid and invalid data zones are defined by rows of said image sensor.

46. The method of claim 31, wherein said low resolution clocking out step includes the step of producing a low resolution parameter determination frame of image data in which a first row of said image sensor, a second valid zone includes pixel positions corresponding to pixels of a row proximate first row of said image sensor, a second valid zone includes pixel positions corresponding to pixels of a row proximate a center row of image sensor, and a third valid zone includes pixel positions corresponding to pixels of a row proximate a last row of said image sensor.

47. The method of claim 31, wherein said low resolution mode clocking out step includes the step of clocking out at least three frames of image data from an image sensor that includes a one frame buffer.

48. The method of claim 31, wherein said low resolution mode clocking out step includes the step of clocking out said frame of image data from an 1D image sensor.

49. The method of claim 31, wherein said low resolution mode clocking out step includes the step of clocking out said frame of image data from a 2D image sensor.

50. The method of claim 31, wherein said method further includes the step of actuating a trigger, and wherein said low resolution clock out step, said reading step and said decoding steps are executed in response to said actuating of said trigger.

51. The method of claim 31, wherein said utilizing step includes the step of commencing said utilizing step after a predetermined number of frames subsequent to a trigger actuation have been clocked out by said optical reader while operating in accordance with said low resolution frame clock out mode of operation.

52. The method of claim 31, wherein said utilizing step includes the step of operating said optical reader in a normal resolution clock out mode of operation.

53. The method of claim 31, wherein said utilizing step includes the step of operating said optical reader in a normal resolution clock out mode of operation in which a frame clock out period is about 33.37 ms.

54. The method of claim 31, wherein said utilizing step includes the step of clocking out electrical signals corresponding to every pixel of said image sensor.

55. The method of claim 31, wherein said low resolution clock out step includes the step of clocking out a plurality of frames of image data, wherein said reading step includes the step of determining an exposure parameter, and wherein said utilizing step includes the step of utilizing said exposure parameter in developing said frame of image data.

56. The method of claim 31, wherein a frame clock out period of said sensor in said low resolution mode clocking out step is less than half of a duration of a frame clock out period of said image sensor when said frame that is subject to decoding is clocked out.

57. The method of claim 31, wherein said low resolution clock out step includes the step of avoiding attempting to decode decodable symbols represented in frames of image data clocked out in said low resolution clock out mode.

58. The method of claim 31, wherein said utilizing step includes the step of utilizing said operating parameter in developing a first frame of image data obtained after a trigger actuation that is to be subject to decoding.

59. The method of claim 31, wherein said low resolution mode clocking out step includes the step of varying a speed at which pixels are clocked out during the course of clocking out said at least one frame of image data.

60. The method of claim 31, wherein said low resolution mode clocking out step includes the step of clocking out electrical signals corresponding to a first set of pixels of said image sensor at a first speed, and clocking out electrical signals corresponding to a second set of pixels of said image sensor at a second speed.

61. The method of claim 31, wherein said low resolution mode clock out step includes the step of clocking out at least one pixel of said image sensor at a speed inappropriate for allowing generation of an electrical signal that accurately represents light incident on said at least one pixel.

62. The method of claim 31, wherein said low resolution mode clock out step includes the step of not clocking out electrical signals corresponding to some of said pixels of said image sensor.

63. The method of claim 31, wherein said low resolution mode clocking out step includes the step of clocking out a plurality of pixels of said image sensor at speeds inappropriate for allowing generation of electrical signals that accurately represent light incident on said plurality of pixels.

64. The method of claim 31, wherein said low resolution mode clocking out step includes the step includes the step of clocking out certain pixels of said image sensor at a normal pixel clock out rate appropriate for allowing generation of electrical signals accurately representing light incident on said certain pixels.

65. The method of claim 31, further including the step of wearing said optical reader on a finger.

66. The method of claim 31, wherein said low resolution clocking out step includes the step of clocking out certain pixels of said image sensor at speeds inappropriate for allowing development of electrical signals accurately representing light incident on said pixels.

67. The method of claim 31, wherein said low resolution clocking out step includes the step of producing a low resolution frame of image data including at least one valid zone and at least one invalid zone, wherein said at least one valid zone includes pixel positions corresponding to an entire row of pixels of said image sensor.

68. The method of claim 31, wherein said low resolution clocking out step includes the step of producing a low resolution frame of image data including at least one valid zone and at least one invalid zone, wherein said at least one valid zone includes pixel positions corresponding to an entire center row of pixels of said image sensor.

69. An optical reader comprising:
an imaging assembly having a CCD image sensor;
a controller, wherein said controller is adapted to clock out at least one low resolution frame of image data utilizing said CCD image sensor, wherein said controller is adapted to read pixel values from said at least one low resolution frame of image data to determine an operating parameter of said reader, wherein said controller is adapted to utilize said operating parameter in developing a subsequent from a image data, and wherein said controller is further adapted to decode a decodable symbol representation represented in said subsequent frame of image data developed utilizing said operating parameter.

70. The optical reader of claim 69, wherein said optical reader includes an illumination assembly having a light emitting diode.

71. The optical reader of claim 69, wherein said optical reader as hand held, 72. The optical reader of claim 69, wherein said optical reader is a presentation reader.

73. The optical reader of claim 69, wherein said optical reader includes a laser light source directing light from said optcal reader toeard to target.

74. The optical reader of claim, wherein said controller develops said low resolution frame of image data by clocking out electrical signals corresponding to some pixels of said image sensor at a higher than normal nite.

75. The optical reader of claim 69, wherein said operating parameter in an exposure parameter value.

76. The optical reader of claim 69, wherein said operating parameter is an illumination intensity value.

77. The optical reader of claim 69, wherein said operating parameter is an illumination on-time value.

78. The optical reader of claim 69, wherein said operating parameter is an amplifier gain permanent value.

79. The optical reader of claim 69, wherein said operating parameter is a dark level adjustment value.

80. The optical reader of claim 69, wherein said operating parameter is a light level adjustment value.

81. The optical reader of claim 69, further comprising an illumination assembly.

82. The optical reader of claim 69, further comprises a memory device storing said pixel values, wherein said controller, when reading said pixel values to determine said operating parameter reads said pixel values from said memory device.

83. The optical reader of claim 69, further comprising an illumination assembly, wherein said illuminaion assembly comprises at least one white LED.

84. The optical reader of claim 69, further comprising an illumination assembly, wherein said illumination assembly comprises a layer light source.

85. The optical reader of claim 69, further comprising a wireless communication link.

86. The optical reader of claim 69, further comprising a hand held housing, wherein said image sensor is a 2D image sensor disposed in said housing.

87. The optical reader of claim 69, further comprising a hand held housing encapsulating said image sensor, a display, and a keyboard.

88. The optical reader of claim 69, wherein said optical reader is adapted so that when actuated to decode a decodable symbol, said controller operates said image sensor at a first frame rate for a predetermined time and then automatically changes a frame rate of said image sensor from said first frame rate to a second frame rate.

89. The optical reader of claim 69, wherein said optical reader is configured so that when actuated to decode a decodable symbol, said controller operates said image sensor at a first frame rate for a plurality of frame clock out periods and then automatically changes a frame rate of said image sensor from said first frame rate to a second frame rate, said second frame rate being slower than the first frame rate.

90. The optical reader of claim 69, wherein said optical reader is adapted so that when actuated to decode a decodable symbol, said controller operates said image sensor at a first frame rate for a plurality of frame clock out periods and then automatically changes a frame rate of said image sensor from said first frame rate to a second frame rate of about 30 frames per second, said second frame rate being slower than said first frame rate.

91. The optical reader of claim 69, wherein said image sensor is a 2D CCD image sensor configured to receive control signals that change a frame rate thereof.

92. The optical reader of claim 69, wherein said optical reader includes a housing and a trigger, and wherein said optical reader is adapted so that when said trigger is actuated, said optical reader automatically clocks out a plurality of said low resolution frames of image data followed by at least one normal resolution frame of image data, and wherein said optical reader further in response to said trigger being actuated determines said operating parameter of said optical reader by reading pixel values of at least one of said plurality of low resolution frames of image data.

93. The optical reader of claim 92, wherein said trigger is proximate said housing.

94. The optical reader of claim 69, wherein said optical reader includes a trigger, and wherein said optical reader is adapted so that in response to said trigger being actuated, said optical reader clocks out a plurality of low resolution frames of image data.

95. The optical reader of claim 69, wherein a frame rate associated with said at least one low resolution frame of image data is faster than a frame rate associated with said frame that is subjected to decoding.

96. The optical reader of claim 69, wherein said image sensor comprises a one frame buffer.

97. The optical reader of claim 69, wherein said at least one low resolution frame of image data is not subject to decoding.

98. The optical reader to claim 69, wherein said frame of image data developed utilizing said operating parameter is a first frame of a succession of frames of image data clocked out by said controller that is not a low resolution frame of image data.

99. The optical reader of claim 69, wherein said controller when utilizing said operating parameter in developing said frame of image data communicates said operating parameter to said image sensor.

100. The optical reader of claim 69, wherein said optical reader is configured so that when actuated to decode a decodable symbol, said controller operates said image sensor at a first frame rate for a plurality of frame clock out periods and subsequently changes a frame rate of said image sensor from said first frame rate to a second frame rate, the second frame rate being slower than said first frame rate.

101. The optical reader of claim 69, wherein said at least one low resolution frame of image data includes at least one valid zone and at least one invalid zone, wherein said at least one valid zone includes pixel positions corresponding to an entire row of pixels of said image sensor.

102. The optical reader of claim 69, wherein said at least one low resolution frame of image data includes at least one valid zone and at least one invalid zone, wherein said at least one valid zone includes pixel positions corresponding to an entire center row of pixel of said image sensor.

103. The optical reader in claim 69, further comprising a trigger and a hand held housing encapsulating said image sensor, wherein said image sensor is a 2D image sensor, and wherein said optical reader is adapted so that in response to said trigger being actuated, said optical reader clocks out said at least one low resolution frame of image data followed by said subsequent frame of image data developed utilizing said operating parameter, wherein said optical reader is adapted so that said subsequent frame of image data developed utilizing said operating parameter has a larger number of pixel values representative of light on a pixel of said 2D image sensor than said at least one low resolution frame of image data.

104. The optical reader of claim 103, wherein said controller in clocking out said at least one low resolution frame of image data clocks out electrical signals corresponding to some pixels of said 2D image sensor at a higher than normal clock out rate so that an overall frame clock out rate is increased.

105. The optical reader of claim 103, wherein said controller in clocking out said at least one low resolution frame of image data clocks out some rows of said 2D image sensor at a normal clock out rate and other rows of said 2D image sensor at a higher than normal clock out rate.

106. The optical reader of claim 103, wherein said 2D image sensor includes a discharge function actuated by activation of a discharge control signal, wherein said controller in clocking out said at least one low resolution frame of image data intermittently activates said discharge control signal while clocking out a frame of image data.

107. The optical reader of claim 103, wherein said at least one low resolution frame of image data includes at least one valid zone and at least one invalid zone, wherein said at least one valid zone includes pixel positions corresponding to an entire row of pixels of said image sensor.

108. The optical reader of claim 103, wherein said at least one low resolution frame of image data includes at least one valid zone and at least one invalid zone, wherein said at least one valid zone includes pixel positions corresponding to an entire center row of pixels of said image sensor.

109. The optical reader of claim 103 wherein said operating parameter is an exposure parameter value.

110. The optical reader of claim 103, wherein said operating parameter is an illumination intensity value.

111. The optical reader of claim 103, wherein said operating parameter is an illumination on-time value.

112. The optical reader of claim 103, wherein said operating parameter is an amplifier gain parameter value.

113. The optical reader of claim 103, wherein said operating parameter is a dark level adjustment value.

114. The optical reader of claim 103, wherein said at least one low resolution frame of image data includes valid and invalid data zones, said valid and invalid zones being defined by rows of said image sensor.

115. The optical reader of claim 103, wherein said at least one low resolution frame of image data includes a plurality of valid and invalid data zones, wherein a first valid zone includes pixel positions corresponding to pixels of a row proximate first row said 2D image sensor, a second valid zone includes pixel positions corresponding to pixels of a row proximate a center row of said 2D image sensor, and a third valid zone includes pixel positions corresponding to pixels of a row proximate a last row of said 2D image sensor.

116. The optical reader of claim 103, wherein said at least one low resolution frame of image data includes a plurality of valid and invalid data zones, wherein at least one valid zone includes pixel positions corresponding to pixels of less than a complete row of pixels of said 2D image sensor.

117. The optical reader of claim 103, wherein said at least one low resolution frame of image data includes a plurality of valid and invalid data zones, said valid zones being spaced apart from one another, and each of said valid zones including pixel positions corresponding to a complete row of pixels of said 2D image sensor.

118. The optical reader of claim 103, wherein said controller in clocking out said at least one low resolution frame of image data clocks out at least three low resolution frames of image data.

119. The optical reader of claim 103, wherein said controller in clocking out said at least one low resolution frame of image data clocks out electrical signals represent light incident on said pixels without generating received light indicating electrical signals for remaining rows of pixels of said 2D image sensor.

120. The optical reader of claim 103, wherein said controller, in determining said operating parameter reads pixel values corresponding to pixel positions of said low resolution frame of image data, said pixel positions read by said controller in determining said operating parameter including pixel positions corresponding to pixels of:
(a) a row proximate a first row of pixels of said image sensor, (b) a row proximate a center row of pixels of said image sensor; and (c) a row proximate a last row of pixels of said image sensor.

121. The optical reader of claim 103, wherein a frame clock out period of said 2D image sensor when clocking out said frame of image data developed utilizing said operating parameter is about 33.37 ms.

122. The optical reader of claim 103, wherein said controller in clocking out said subsequent frame of image data developed utilizing said operating parameter clocks out electrical signals corresponding to each pixel of said image sensor.

123. The optical reader of claim 103, wherein a frame clock out period associated with said low resolution frame of image data is less than half of a duration of a frame clock out period associated with said high resolution frame clock out period.

124. The optical reader of claim 103, wherein said controller in clocking out said at least one low resolution frame of image data varies a speed at which pixels are clocked out during the course of clocking out said at least one low resolution frame of image data.

125. The optical reader of claim 103, wherein said controller in clocking out said low resolution frame of image data clocks out electrical signals corresponding to a first set of pixels of said 2D image sensor at a first speed, and clocks out electrical signals corresponding to a second set of pixels of said image sensor at a second speed.

126. The optical reader of claim 103, wherein said controller in clocking out said low resolution frame of image data clocks out electrical signals corresponding to at least one pixel of said 2D image sensor at a speed that is inappropriate for allowing generation of an electrical signal that accurately represents light incident on said at least one pixel.

127. The optical reader of claim 103, wherein said controller in clocking out said low resolution frame of image data does not clock out electrical signals corresponding to some pixels of said 2D image sensor.

128. The optical reader of claim 103, wherein said controller in clocking out said low resolution frame of image data clocks out electrical signals corresponding to a plurality of pixels of said image sensor at speeds inappropriate for allowing generation of electrical signals that accurately represent light incident on said plurality of pixels.

129. The optical reader of claim 103, wherein said controller in clocking out said low resolution mode frame of image data clocks out certain pixels of said image sensor at a normal pixel clock out rate appropriate to allow generation of electrical signals accurately representing light incident on said certain pixels.

130. The optical reader of claim 103, wherein said controller in clocking out said low resolution mode frame of image data clocks out certain pixels of said image sensor at speeds inappropriate for allowing development of electrical signals.

131. The optical reader of claim 103, wherein said operating parameter is an exposure parameter value.

132. The optical reader of claim 103, wherein said operating parameter is an illumination intensity value.

133. The optical reader of claim 103, wherein said operating parameter is an illumination on-time value.

134. The optical reader of claim 103, wherein said operating parameter is an amplifier gain parameter value.

135. The optical reader of claim 103, wherein said operating parameter is a dark level adjustment value.

136. The optical reader of claim 103, wherein said operating parameter is a light adjustment value.

137. The optical reader of claim 103, wherein said imaging assembly includes an illumination assembly.

138. The optical reader of claim 103, wherein said optical reader includes an illumination assembly comprises at least one LED.

139. The optical reader of claim 103, wherein said optical reader includes an illumination assembly, and wherein said illumination assemly comprises at least one white LED.

140. The optical reader of claim 103, wherein said optical reader includes an illumination assembly, and wherein said illumination assembly comprises a laser light source.

141. The optical reader of claim 103, wherein said optical reader includes a wireless communication link.

142. The optical reader of claim 103, wherein said frame of image data developed utilizing said operating parameter is a first frame of a succession of frames of image data clocked out by said controller that is not a low resolution frame of image data.

143. The optical reader of claim 103, wherein said controller when utilizing said operating parameter in developing said frame of image data, communicates said operating parameter to said image sensor.

144. The optical reader of claim 103, wherein said low resolution frame of image data includes a plurality of pixel values that are not representative of light incident on a pixel.

145. The optical reader of claim 103, further comprising a memory device storing said pixel values that are read by said controller when determining said operating parameter.

146. The optical reader of claim 103, wherein said operating parameter is a light level adjustment value.

147. The optical reader of claim 103, wherein said controller, in clocking out said at least one low resolution frame of image data clocks out a plurality of frames of image data and, wherein said controller, in determining said operating parameter determines an exposure parameter.

* * * * *

UNITED STATES PATENT AND TRADEMARK OFFICE
CERTIFICATE OF CORRECTION

| | | |
|---|---|---|
| PATENT NO. | : 7,268,924 B2 | Page 1 of 1 |
| APPLICATION NO. | : 09/766922 | |
| DATED | : September 11, 2007 | |
| INVENTOR(S) | : Robert M. Hussey et al. | |

It is certified that error appears in the above-identified patent and that said Letters Patent is hereby corrected as shown below:

In the Claim:

In Claim 69 (Column 14, Line 10). Please delete "developing a subsequent from a image data," and replace with -- developing a subsequent frame of image data --

Signed and Sealed this

Thirtieth Day of August, 2011

David J. Kappos
*Director of the United States Patent and Trademark Office*